United States Patent

Matzkin-Bridger

[11] Patent Number: 5,902,691
[45] Date of Patent: May 11, 1999

[54] FUEL CELL WITH SHARED SPACE FOR ELECTRODE ASSEMBLY

[75] Inventor: Andrew Matzkin-Bridger, West Bloomfield, Mich.

[73] Assignee: UT Automotive Dearborn, Inc., Dearborn, Mich.

[21] Appl. No.: 08/958,220

[22] Filed: Oct. 27, 1997

[51] Int. Cl.[6] .................................................. H01M 8/00
[52] U.S. Cl. ................................ 429/12; 429/32; 429/42
[58] Field of Search .................................. 429/32, 42, 27, 429/12

[56] References Cited

U.S. PATENT DOCUMENTS

| | | | |
|---|---|---|---|
| 4,769,296 | 9/1988 | Sterzel | 429/12 |
| 4,988,582 | 1/1991 | Dyer | 429/30 |
| 5,151,334 | 9/1992 | Fushimi et al. | 429/32 |

Primary Examiner—Maria Nuzzolillo
Assistant Examiner—Laura Weiner
Attorney, Agent, or Firm—Howard & Howard

[57] ABSTRACT

The invention relates to a fuel cell stack with two separators in which adjacent, but spaced apart, electrode assemblies share either a fuel space or an oxidizer space between them. Each of the electrode assemblies includes a proton exchange membrane sandwiched between an anode and a cathode. A first electrode assembly is positioned apart from one of the separators and oriented with either its anode or its cathode facing that separator. Subsequent electrode assemblies are placed between the first electrode assembly and the other separator. Each subsequent electrode assembly is oriented with the opposite side, anode or cathode, as compared to the immediately preceding electrode assembly, facing the separator that is adjacent the first electrode assembly. Each space that has at least one side defined by an anode is used as a fuel space. Each space that has at least one side defined by an cathode is used as a oxidizer space. Within the stack the anodes and the cathodes of the electrode assemblies are electrically coupled to each other.

13 Claims, 4 Drawing Sheets

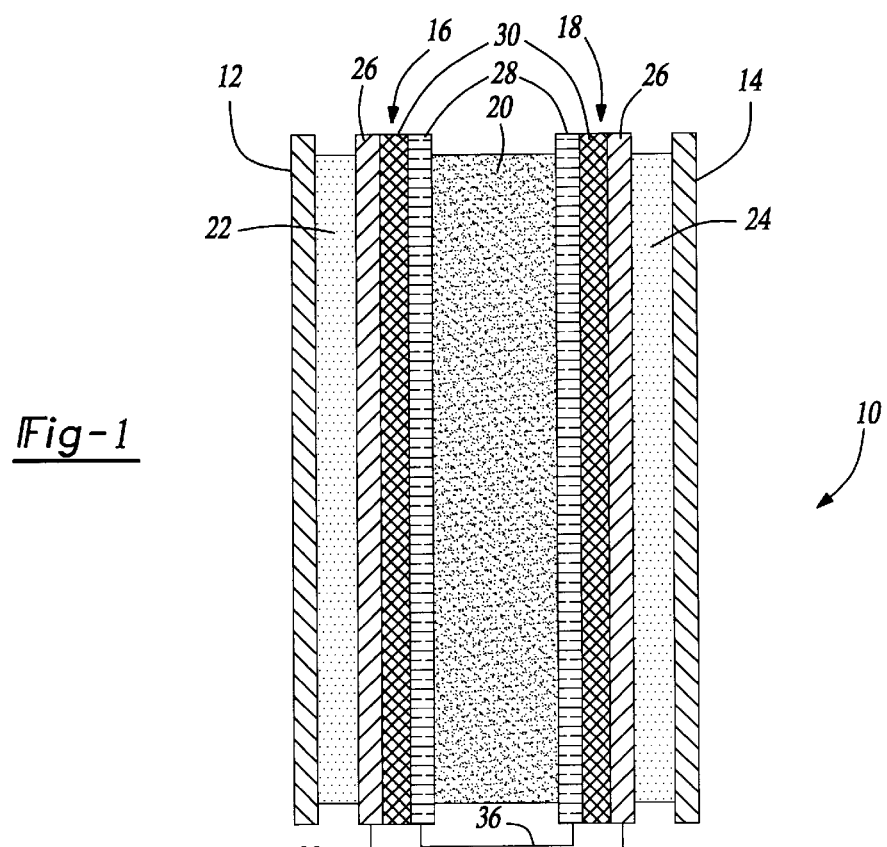
_Fig-1_
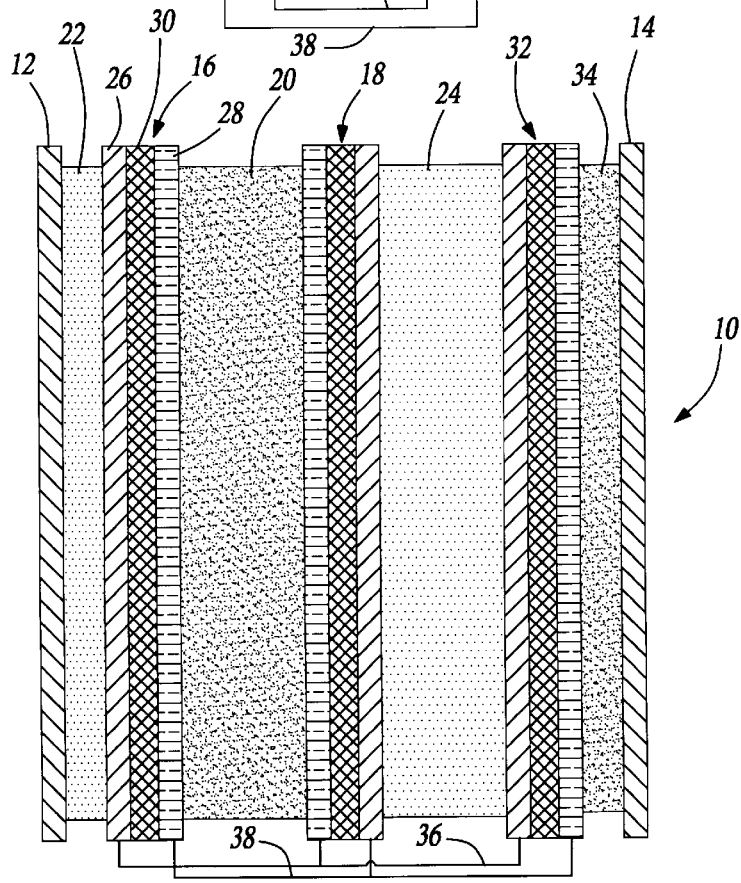
_Fig-2_

5,902,691

FUEL CELL WITH SHARED SPACE FOR ELECTRODE ASSEMBLY

BACKGROUND OF THE INVENTION

This invention generally relates to a fuel cell stack having a unique arrangement requiring fewer components.

A typical fuel cell comprises an electrode assembly placed centrally between a first and a second separator. Spaces are defined between each separator and an associated side of the electrode assembly. The electrode assembly typically comprises a proton exchange membrane sandwiched between an anode and a cathode. A fuel is introduced into the space between the anode and its opposing separator and an oxidizer is introduced between the cathode and its opposing separator. The fuel and oxidizer react with the anode and cathode respectively, and electrical energy is produced from the reactions.

For some uses it is desirable to combine several fuel cells together to produce a fuel cell stack. In general, fuel cell stacks have been produced by placing individual fuel cells next to each other and then electrically coupling the fuel cells to each other to produce the fuel cell stack. However, this method of producing a fuel cell stack has the disadvantages of duplication of components and undesirable bulk.

Therefore, it is desirable to provide a fuel cell stack that permits sharing of common components among the fuel cells within the stack and that is more compact.

SUMMARY OF THE INVENTION

In general terms this invention provides a unique arrangement of fuel cell components which permits fuel cells in a fuel cell stack to share a fuel space, an oxidizer space, or both.

Preferably, a fuel cell stack designed according to this invention comprises a first separator and a second separator spaced apart to define the stack. At least a first and a second electrode assembly are spaced apart in the stack to define a first intermediate space. The electrode assemblies are also spaced apart from the first and the second separators to define a second space between the first electrode assembly and the first separator and a third space between the second electrode assembly and the second separator. The electrode assemblies comprise an anode and a cathode with a proton exchange membrane sandwiched between them. The first and the second electrode assemblies are oriented in the stack such that either their anodes or their cathodes face one another on opposite sides of the first space. When the cathodes face one another, the first space is used as an oxidizer space and the second and the third spaces are used as fuel spaces. When the anodes face one another, the first space is used as a fuel space and the second and the third spaces are used as oxidizer spaces.

The method of the invention comprises the steps of forming a fuel cell stack that includes a first separator, a second separator, and at least a first and a second electrode assembly. The electrode assemblies each include an anode and a cathode with a proton exchange membrane sandwiched between them. The first and second separators are spaced apart to define the stack. The electrode assemblies are placed in the stack and are spaced apart to define a first space. The first electrode assembly is oriented with either its anode or its cathode facing the first separator and thus defines a second space between itself and the first separator. The second electrode assembly is positioned between the first electrode assembly and the second separator and oriented with the alternate side as compared to the first electrode assembly facing the first separator, thus defining a third space between itself and the second separator. Additional electrode assemblies may be added between the second electrode assembly and the second separator. Each subsequent electrode assembly is oriented with the alternate side as compared to the preceding electrode assembly facing the first separator.

The advantages of the invention include a reduction in the number of fuel and oxidizer spaces in the stack, a reduced number of components in the stack, and lower bulk of the stack.

These and other features and advantages of this invention will become more apparent to those skilled in the art from the following detailed description of the presently preferred embodiment. The drawings that accompany the detailed description can be described as follows.

BRIEF DESCRIPTION OF THE DRAWINGS

FIG. 1 is a cross sectional view of a fuel cell stack designed according to one embodiment of the invention;

FIG. 2 is a cross sectional view of a fuel cell stack designed according to an alternative embodiment of the invention;

DESCRIPTION OF THE PREFERRED EMBODIMENT

Figure 3:
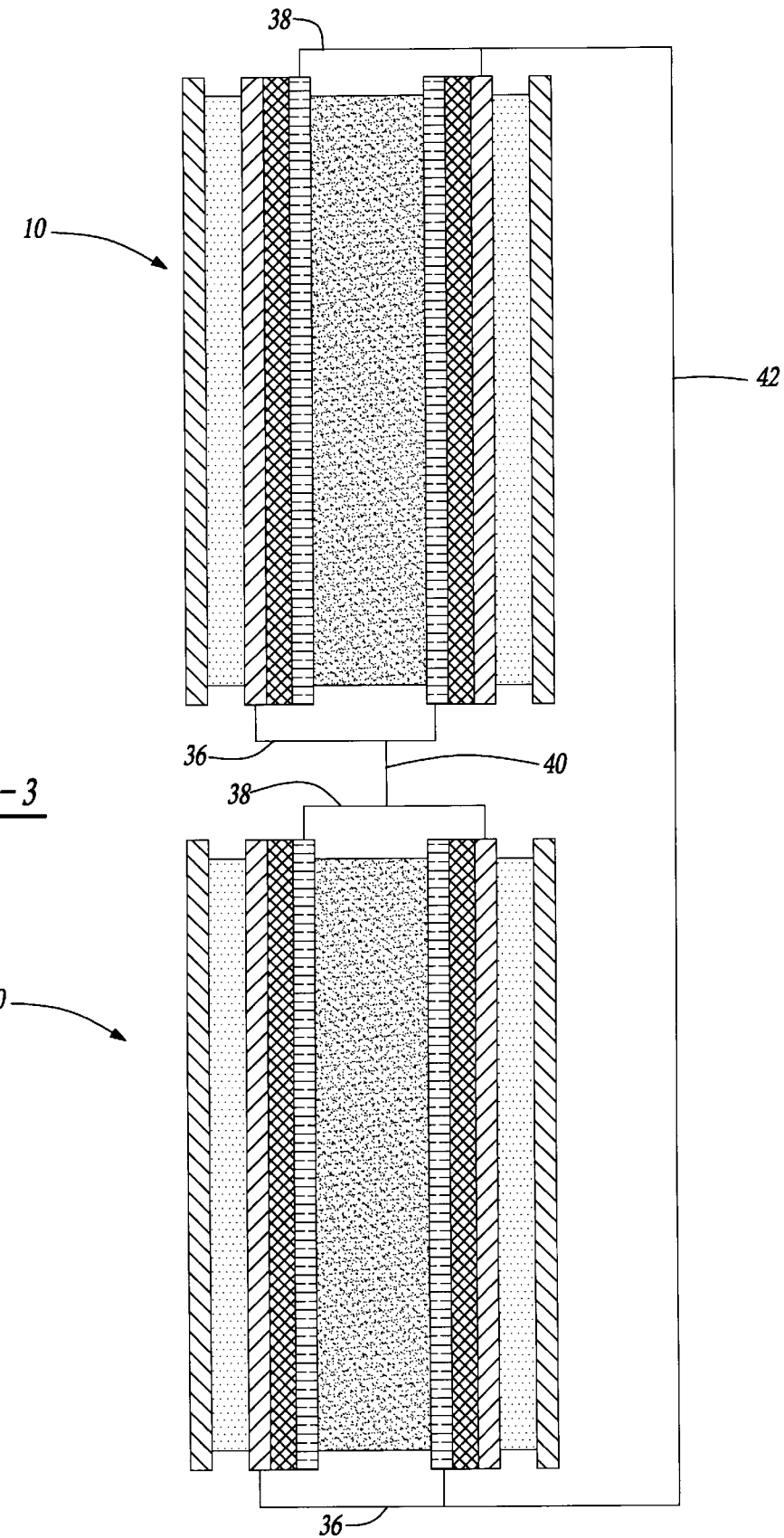
FIG. 3 is a cross sectional view of a pair of fuel cell stacks designed according to one embodiment of the invention wherein the electrode assemblies within a fuel cell stack are connected in series and the fuel cell stacks are connected in series.

A fuel cell stack is generally indicated at 10 in FIG. 1. A first separator 12 and a second separator 14 are spaced apart and define the extremes of stack 10. A first electrode assembly 16 and a second electrode assembly 18 are spaced apart in the stack 10. A first space 20 is defined between the first and the second electrode assemblies 16 and 18. A second space 22 is defined between the first electrode assembly 16 and the first separator 12 and a third space 24 is defined between the second electrode assembly 18 and the second separator 14. Each electrode assembly, 16 and 18, comprises an anode 26 and a cathode 28 with a proton exchange membrane 30 sandwiched between them. The structure of such electrode assemblies is known to persons of ordinary skill in the art who will appreciate that other designs could be substituted.

Electrode assemblies 16 and 18 are oriented so that either anodes 26 or cathodes 28 face one another on opposite sides of the first space 20. In FIG. 1, the cathodes 28 of electrode assemblies 16 and 18 are facing one another. When the cathodes 28 face one another, as shown in FIG. 1, the first space 20 is used as an oxidizer space while second and the third spaces 22 and 24 are used as fuel spaces. Alternatively, when the anodes 26 face one another the first space 20 is used as a fuel space while the second and the third spaces 22 and 24 are used as oxidizer spaces. As will be appreciated by those skilled in the art, the fuel and oxidizer are typically introduced into their respective spaces through a diffuser plate. The structure of such diffuser plates is known in the art and forms no part of this invention. In the embodiment shown, a first connector 36 and a second connector 38 connect the anodes 26 and the cathodes 28, respectively, in parallel. As will be appreciated by those of skill in the art, connecting the electrode assemblies 16 and 18 in parallel sums their currents. The electrode assemblies 16 and 18 could also be connected in series, as an example shown below in FIG. 2, to sum their voltages. Both embodiments can be either in series or in parallel.

In FIG. 2 an alternative embodiment of the invention is shown. In this embodiment a third electrode assembly 32 is positioned between the second electrode assembly 18 and the second separator 14, thereby defining a fourth space 34 between the third electrode assembly 32 and the second separator 14. In this embodiment, the third electrode assembly 32 is preferably oriented in the same manner as the first electrode assembly 16. Thus, either the anode 26 or the cathode 28 of the second and the third electrode assemblies 18 and 32 face one another on opposite sides of the third space 24. In the embodiment as shown in FIG. 2, the second and the third spaces 22 and 24 are used as fuel spaces since the cathode 28 of the first and the second electrode assemblies 16 and 18 face one another and the anode 26 of the second and the third electrode assemblies 18 and 32 face one another. The fourth and the first spaces 34 and 20 are used as oxidizer spaces. Alternatively, the second and the third spaces, 22 and 24, are used as oxidizer spaces while the first and the fourth spaces, 20 and 34, are used as fuel spaces if anode 26 of the first and the second electrode assemblies 16 and 18 face one another and the cathode 28 of the second and the third electrode assemblies 18 and 32 face one another.

As will be appreciated by one skilled in the art, additional electrode assemblies can be placed between the third electrode assembly 32 and the second separator 14. In FIG. 2 the electrode assemblies 16, 18 and 32 are shown as connected in series by first and second connectors 36 and 38 thus summing their voltages. As will be appreciated by one skilled in the art the electrode assemblies 16, 18 and 32 could alternatively be connected in parallel, as shown in FIG. 1 above, to sum their currents.

Figure 4:
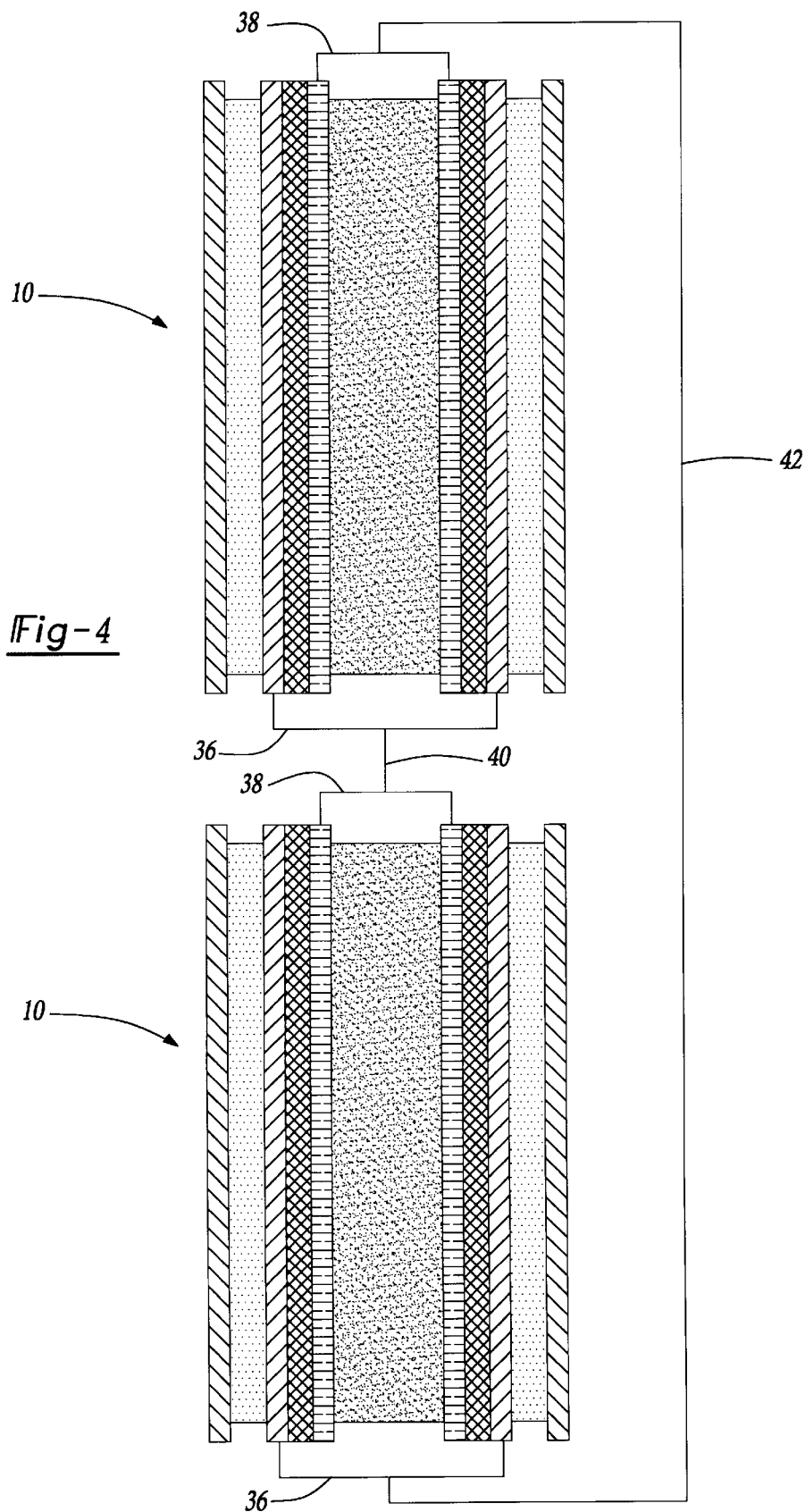
FIG. 4 is a cross sectional view of a pair of fuel cell stacks designed according to one embodiment of the invention wherein the electrode assemblies within a fuel cell stack are connected in parallel and the fuel cell stacks are connected in series.
Figure 5:
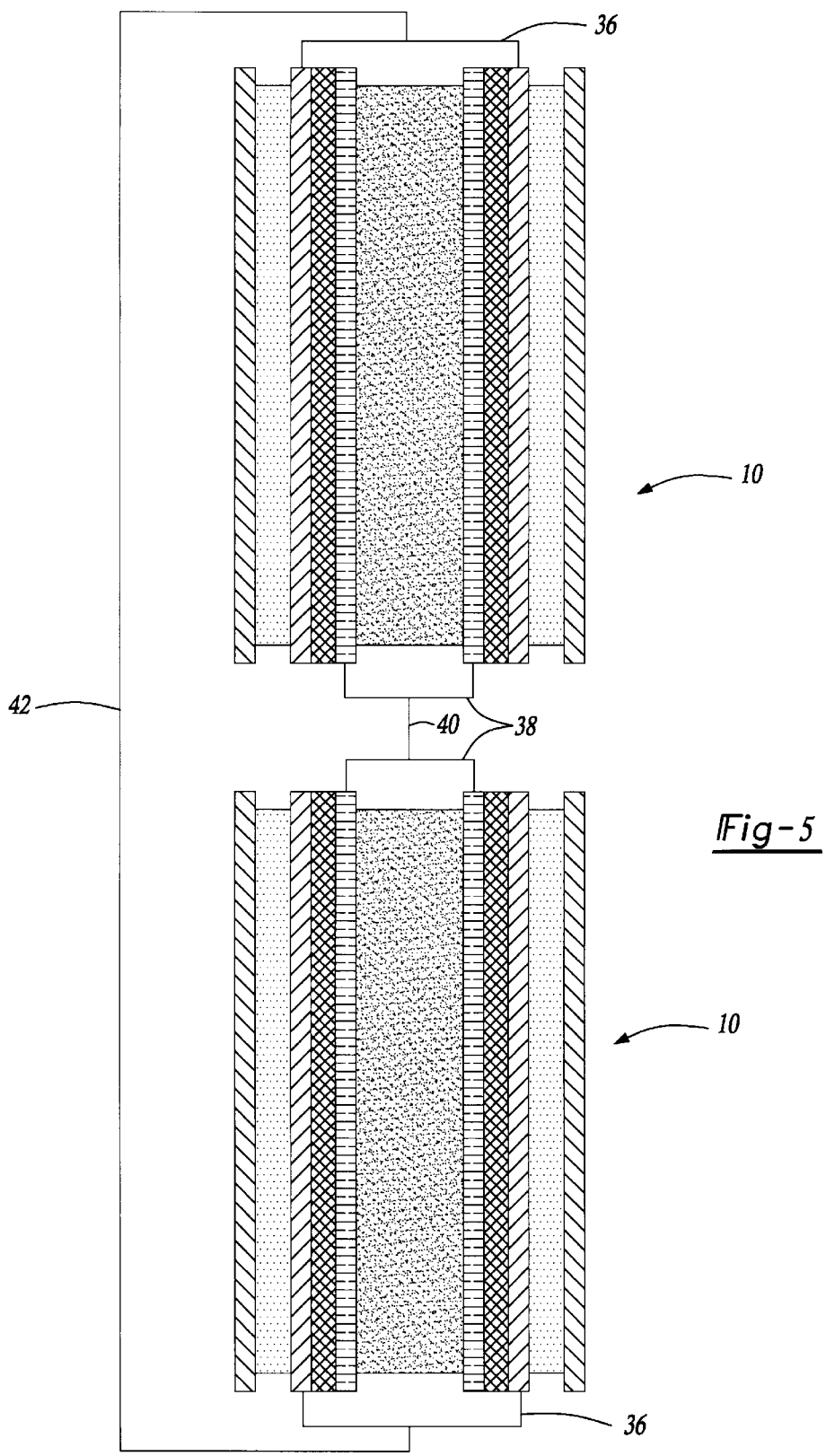
FIG. 5 is a cross sectional view of a pair of fuel cell stacks designed according to one embodiment of the invention wherein the electrode assemblies within a fuel cell stack are connected in parallel and the fuel cell stacks are connected in parallel.

As will be appreciated by those skilled in the art, the anodes 26 and the cathodes 28 within each stack 10 must be electrically coupled, preferably at one end. The anodes 26 and the cathodes 28 can be connected either in series to add the voltages or in parallel to add the currents. Additionally, as shown in FIGS. 3 through 5, several stacks 10 can be electrically coupled either in series or in parallel depending on whether it is desirable to sum the voltages or the currents. In FIG. 3 the electrode assemblies are connected in series and the stacks 10 are connected in series by a pair of connectors 40 and 42 to create a fuel cell super stack 44. In FIG. 4 the electrode assemblies are connected in parallel and the stacks 10 are connected in series by connectors 40 and 42. In FIG. 5 the electrode assemblies are connected in parallel and the stacks 10 are connected in parallel by connectors 40 and 42. As will be appreciated by those skilled in the art, in FIGS. 3 through 5, for simplicity, only two electrode assemblies per stack 10 and two stacks 10 were shown. In FIGS. 3 through 5 each stack 10 could have included additional electrode assemblies and more than two stacks 10 could have been connected together.

As will be appreciated by those skilled in the art, the typical fuel material is hydrogen and the typical oxidizer is oxygen. Other fuels and oxidizers can be utilized as will be appreciated by those skilled in the art.

In practicing the method of this invention, at least a first and a second electrode assembly 16 and 18 are placed apart in a stack 10 having a first and a second separator 12 and 14 and they define a first space 20 between them. The first electrode assembly 16 is spaced apart from the first separator 12 and oriented with either the anode 26 or the cathode 28 facing the first separator 12 to define a second space 22. The second electrode assembly 18 is positioned in the stack 10 between the first electrode assembly 16 and the second separator 14. The second electrode assembly 18 is oriented with the opposite side, anode 26 or cathode 28, as compared to the first electrode assembly facing the first separator 12 and defines a third space 24 between itself and the second separator 14. Any space wherein at least one side is defined by the anode 26 of an electrode assembly is used for introducing a fuel. Any space wherein at least one side is defined by a cathode 28 of an electrode assembly is used for introducing an oxidizer. Subsequent electrode assemblies can be positioned between the second electrode assembly 18 and the second separator 14. Each subsequent electrode assembly is oriented with the opposite side, anode 26 or cathode 28, as compared to the electrode assembly preceding it, facing the first separator 12.

The invention has been described in an illustrative manner, and it is to be understood that the terminology which has been used is intended to be in the nature of words of description rather than of limitation.

The foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

We claim:

1. A fuel cell stack comprising:
    a first separator and a second separator spaced apart to define said stack;
    at least a first and a second electrode assembly disposed between said first and said second separators, and spaced apart in said stack to define a first space therebetween and spaced from said first and said second separators to define a second space between said first electrode assembly and said first separator and a third space between said second electrode assembly and said second separator;
    each of said electrode assemblies comprising an anode and a cathode with a proton exchange membrane sandwiched between said anode and said cathode;
    said electrode assemblies disposed in said stack with one of said anode and said cathode of both of said electrode assemblies facing one another on opposite sides of said first space;
    whereby said first space is employed as one of an oxidizer space and a fuel space, while said second and said third space are employed as the other of said fuel space and said oxidizer space.

2. A fuel cell stack as recited in claim 1 including a third electrode assembly disposed in said third space between said second electrode assembly and said second separator thereby defining a fourth space between said third electrode assembly and said second separator, said second and said third electrode assemblies disposed in said stack with one of said anodes and said cathodes of both of said electrode assemblies facing one another on opposite sides of said third space;

whereby said second and said third space are employed as one of said oxidizer space and said fuel space, while said first and said fourth space are employed as the other of said oxidizer space and said fuel space.

3. A fuel cell stack as recited in claim 1 wherein said anodes and said cathodes are electrically connected in parallel.

4. A fuel cell stack as recited in claim 1 wherein said anodes and said cathodes are electrically connected in series.

5. A fuel cell stack comprising:

at least a first and a second fuel cell stack;

each of said fuel cell stacks including a first separator, a second separator, and at least a first and a second electrode assembly;

said first and said second separator spaced apart to define said stack;

said first and said second electrode assemblies disposed between said first and said second separators, and spaced apart in said stack to define a first space therebetween and spaced from said first and said second separators to define a second space between said first electrode assembly and said first separator and a third space between said second electrode assembly and said second separator;

each of said electrode assemblies comprising an anode and a cathode with a proton exchange membrane sandwiched between said anode and said cathode;

said electrode assemblies disposed in said stack with one of said anode and said cathode of both of said electrode assemblies facing one another on opposite sides of said first space;

whereby said first space is employed as one of an oxidizer space and a fuel space, while said second and said third space are employed as the other of said fuel space and said oxidizer space; and wherein said first fuel cell stack is electrically coupled to said second fuel cell stack.

6. A fuel cell stack as recited in claim 5 wherein said first and said second fuel cell are electrically coupled in parallel.

7. A fuel cell stack as recited in claim 5 wherein said first and said second fuel cell are electrically coupled in series.

8. A method of forming a fuel cell stack including;

providing a first separator and a second separator spaced apart to define outer ends of said stack, at least a first and a second electrode assembly positioned between said first and said second separators, and spaced apart in said stack to define a first space therebetween, each of said electrode assemblies comprising an anode and a cathode with a proton exchange membrane sandwiched between said anode and said cathode;

positioning said first electrode assembly in said stack spaced from said first separator and orienting said first electrode assembly with one of said anode and said cathode facing said first separator to define a second space between said first electrode assembly and said first separator; and positioning said second electrode assembly in said stack spaced between said first electrode assembly and said second separator and orienting said second electrode assembly with the opposite one of said anode and said cathode facing said first separator to define a third space between said second electrode assembly and said second separator.

9. A method of forming a fuel cell stack as recited in claim 8 wherein said method further comprises the step of;

placing a third electrode assembly in said stack spaced between said second electrode assembly and said second separator and orienting said third electrode assembly in the same orientation as said first electrode assembly to define a fourth space between said third electrode assembly and said second separator.

10. A method of forming a fuel cell stack as recited in claim 9 wherein said method further comprises the steps of:

introducing a fuel into one of said second and said third space or said first and said fourth space and an oxidizer into the other of said second and said third space or said first and said fourth space.

11. A method of forming a fuel cell stack as recited in claim 8 wherein said method further comprises the step of electrically connecting said anodes and said cathodes in parallel.

12. A method of forming a fuel cell stack as recited in claim 8 wherein said method further comprises the step of electrically connecting said anodes and said cathodes in series.

13. A method of forming a fuel cell stack as recited in claim 8 wherein said method further comprises the steps of;

introducing a fuel into one of said first space or said second and said third space and an oxidizer into the other of said first space or said second and said third space.

\* \* \* \* \*